US012366102B2

(12) United States Patent
Finke et al.

(10) Patent No.: US 12,366,102 B2
(45) Date of Patent: Jul. 22, 2025

(54) DRIVE UNIT FOR A SLIDING ASSEMBLY, IN PARTICULAR A SLIDING DOOR

(71) Applicant: DORMAKABA DEUTSCHLAND GMBH, Ennepetal (DE)

(72) Inventors: Andreas Finke, Ennepetal (DE); Axel Richstein, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 0 days.

(21) Appl. No.: 17/781,538

(22) PCT Filed: Dec. 3, 2020

(86) PCT No.: PCT/EP2020/084380
§ 371 (c)(1),
(2) Date: Jun. 1, 2022

(87) PCT Pub. No.: WO2021/110798
PCT Pub. Date: Jun. 10, 2021

(65) Prior Publication Data

US 2023/0003070 A1 Jan. 5, 2023

(30) Foreign Application Priority Data

Dec. 4, 2019 (EP) .................................... 19213671

(51) Int. Cl.
*E05F 15/643* (2015.01)

(52) U.S. Cl.
CPC ....... *E05F 15/643* (2015.01); *E05Y 2201/474* (2013.01); *E05Y 2201/499* (2024.05);
(Continued)

(58) Field of Classification Search
CPC ............................ E05F 15/643; E05F 15/632; E05Y 2201/474; E05Y 2201/672;
(Continued)

(56) References Cited

U.S. PATENT DOCUMENTS 3,172,651 A * 3/1965 Wilson .................. E05F 15/643
49/360
3,834,081 A 9/1974 Catlett
(Continued)

FOREIGN PATENT DOCUMENTS

CH 687265 A5 * 10/1996 ................ E05F 1/16
CN 216519442 U * 5/2022
(Continued)

OTHER PUBLICATIONS

International Search Report issued Feb. 4, 2021 re: Application No. PCT/EP2020/084380, pp. 1-2, citing: U.S. Pat. No. 3,834,081 A, EP 1887177 A2, U.S. Pat. No. 3,172,651 A, DE 102006058653 A1 and IT TV20130068 A1.

(Continued)

*Primary Examiner* — Daniel P Cahn
*Assistant Examiner* — Patrick B. Ponciano
(74) *Attorney, Agent, or Firm* — CANTOR COLBURN LLP

(57) ABSTRACT

A drive unit for a sliding arrangement, in particular a sliding door, includes a carriage, which is formed for linearly mobile mounting in relation to a sub-structure of the sliding arrangement, a deflection roller rotatable around a roller axis at the carriage for deflecting a drive belt of the sliding arrangement, and a tensioning device, comprising having a shaft with male thread rotatable around a shaft axis, a first shaft reception with female thread for receiving the male thread of the shaft, a second shaft reception for linear mobile reception of the shaft, and a compression spring between the second shaft reception and a spring abutment at the shaft. The shaft is disposed for tensioning the drive belt by increasing the distance between the first shaft reception and the second shaft reception.

12 Claims, 5 Drawing Sheets

(52) U.S. Cl.
CPC ... *E05Y 2201/652* (2013.01); *E05Y 2201/668* (2013.01); *E05Y 2201/672* (2013.01)

(58) Field of Classification Search
CPC ......... E05Y 2201/668; E05Y 2201/499; E05Y 2201/652; E06B 3/4636; E06B 3/46
See application file for complete search history.

(56) References Cited

U.S. PATENT DOCUMENTS

| | | | | | |
|---|---|---|---|---|---|
| 4,791,757 | A * | 12/1988 | Orlando | E05F 15/643 49/360 |
| 4,901,474 | A * | 2/1990 | Bayard | E05F 15/565 292/144 |
| 4,912,878 | A * | 4/1990 | Bentley | E05B 65/0882 49/411 |
| 7,124,657 | B2 * | 10/2006 | Nagai | F16C 29/02 74/89.22 |
| 7,181,988 | B2 * | 2/2007 | Nagai | F16C 29/063 74/89.22 |
| 8,510,993 | B2 * | 8/2013 | Mellary | B60J 1/1853 49/380 |
| 8,842,829 | B2 * | 9/2014 | Bresson | G07C 9/00309 380/258 |
| 9,476,244 | B2 * | 10/2016 | Miller | E06B 3/4636 |
| 2009/0062046 | A1 | 3/2009 | Lindemann | |
| 2021/0188198 | A1 * | 6/2021 | Bauer | E05B 81/25 |
| 2022/0235597 | A1 * | 7/2022 | Hawkins | F16H 7/12 |
| 2023/0392429 | A1 * | 12/2023 | Cottingham | B60J 7/062 |

FOREIGN PATENT DOCUMENTS

| | | | | |
|---|---|---|---|---|
| DE | 19720861 | A1 * | 11/1997 | B65G 25/06 |
| DE | 102006058653 | A1 * | 6/2008 | E05F 15/643 |
| DE | 102012001187 | A1 * | 7/2013 | E05F 15/643 |
| DE | 102019133071 | A1 | 6/2021 | |
| EP | 0732476 | A1 * | 3/1996 | |
| EP | 1887177 | A2 * | 2/2008 | E05F 15/681 |
| EP | 2161400 | A2 | 3/2010 | |
| EP | 2439369 | A2 * | 4/2012 | E05F 15/643 |
| FR | 2997991 | A1 * | 5/2014 | E05F 15/643 |
| IT | TV20130068 | A1 | 11/2014 | |

OTHER PUBLICATIONS

International Preliminary Report on Patentability for International Application No. PCT/EP2020/084380, dated Jun. 16, 2022, 7 pages.

International Preliminary Report on Patentability for International Application No. PCT/EP2020/084386, dated Jun. 16, 2022, 8 pages.

* cited by examiner

DRIVE UNIT FOR A SLIDING ASSEMBLY, IN PARTICULAR A SLIDING DOOR

TECHNICAL FIELD

The disclosure relates to a drive unit for a sliding arrangement. In particular, the sliding arrangement is formed as a sliding door or as a moving unit for a sliding door. Furthermore, the disclosure relates to the sliding arrangement including drive unit.

BACKGROUND

Herein considered sliding arrangements comprise at least one leaf, for example a door leaf, or are connectable to a door leaf. The sliding arrangement displaces the leaf in horizontal direction. Usually, the sliding arrangement comprises an endlessly circulating drive belt. The leaf is attached to the drive belt and thus can be moved. The DE 10 2006 058 653 A1 shows a corresponding known arrangement.

SUMMARY

The present disclosure provides a drive unit for a sliding arrangement, which is built as compact as possible, is easy to install and can be operated at low maintenance.

This is achieved with the features of the independent claims. Advantageous further developments of the disclosure are the subject matter of the dependent claims.

The disclosure provides a drive unit for a sliding arrangement. In particular, the sliding arrangement is formed as a sliding door or as a moving unit for a sliding door.

The drive unit comprises a carriage, which is formed for linear mobile mounting in relation to a sub-structure of the sliding arrangement. For example, said sub-structure of the sliding arrangement is a rail, to which the drive unit is mounted. The sub-structure can be stationarily disposed at a wall or a door frame, for example. However, as an alternative, it is also possible for the sub-structure to be located at another leaf and the herein shown drive unit including drive belt be used to synchronously move two leaves with regard to each other. In a general consideration, within the scope of the present disclosure, it is explained that the sub-structure can be disposed at a "carrying structure". Said carrying structure is the wall, a door frame or the further leaf, for example.

Furthermore, the drive unit comprises a deflection roller. The deflection roller is located at the carriage and is rotatable about a roller axis. The roller axis is formed for deflecting the drive belt of the sliding arrangement. The drive belt is a toothed belt, for example.

The deflection roller can be motor driven. Preferably however, it is provided for an opposite located roller of the sliding arrangement, herein designated as counter-roller, to be motor driven. For this purpose, the sliding arrangement can comprise an electric motor. Furthermore, it is also possible none of the two rollers be motor driven. This is in particular the case, when the drive unit is used to synchronously move two leaves with regard to each other, wherein a user manually actuates one of the leaves.

Furthermore, the drive unit comprises a tensioning device, which is used to tension the drive belt. Said tensioning device comprises a shaft with a male thread. The shaft is rotatable about a shaft axis. Furthermore, a first shaft reception is provided with a female thread for receiving the male thread of the shaft. The shaft is fitted in the first shaft reception, wherein the female thread of the first shaft reception engages in the male thread of the shaft.

The tensioning device comprises a second shaft reception, which is formed for linearly mobile receiving the shaft. The shaft is fitted in this second shaft reception and is linearly mobile in relation to the second shaft reception. In particular in this case, the linear movement is parallel to the shaft axis.

The tensioning device comprises a compression spring. The compression spring is disposed between the second shaft reception and a spring abutment at the shaft. For example, said spring abutment at the shaft is a turned engagement on the shaft or another element stationarily disposed on the shaft. With one end, the compression spring props up against said spring abutment. The other end of the compression spring props up against the second shaft reception. When reducing the distance between spring abutment and second shaft reception, the compression spring is compressed and exerts a force onto the shaft and the second shaft reception.

The shaft is disposed for tensioning the drive belt by increasing the distance between the first shaft reception and the second shaft reception. For this purpose, it is intended for a tool to rotate the shaft about the shaft axis thereof. In this case, the male thread of the shaft rotates in relation to the female thread of the first shaft reception, whereby the shaft moves in relation to the first shaft reception. At a corresponding direction of rotation, the distance between the first shaft reception and the spring abutment increases thereby such that the spring increases the force pressing on the second shaft reception and thereby the distance increases between the two shaft receptions. Rotating the shaft axis is performed for so long until the desired tension is reached at the drive belt.

Preferably, it is provided for one of the two shaft receptions, in particular the first shaft reception, to be formed for stationary mounting in relation to the sub-structure. Thus preferably, the shaft reception with the female thread is stationarily mountable in relation to the sub-structure. Furthermore, preferably it is provided for the other shaft reception, in particular the second shaft reception, to be disposed, respectively attached to the carriage. The shaft is linearly mobile fitted into said second shaft reception.

Preferably, the compression spring is formed as a spiral spring and is fitted on the shaft. Thereby, ensuring reliable positioning of the compression spring between the second shaft reception and the spring abutment.

Preferably, it is provided for the drive unit to comprise a display device for displaying the tensioning of the drive belt. The display device includes a first display element on the shaft and a second display element. The second display element is stationarily disposed in relation to the second shaft reception. In particular, the second display element is connected to the carriage, in particular of the second shaft reception, or integrally formed therewith.

In the initial state, at the beginning of mounting the drive unit, the two display elements are as remote from each other as possible. By tensioning the drive belt, namely rotating the shaft, and thus increasing the distance between the two shaft receptions, the two display elements move towards each other, until a previously defined and desired tension of the drive belt is reached.

Preferably, the first display element is located at or on the spring abutment. Particularly preferred, the shaft at the spring abutment has a groove, into which the first display element is inserted, in particular a rubber ring. The first display element, in particular the rubber ring, is in particular coloured.

Preferably, the second display element comprises a frame, which is firmly attached to the carriage. Particularly preferred, said frame includes an attachment section, which is attached to the second shaft reception, for example clipsed. Preferably, the frame comprises a window. In particular, the window is slot-shaped. The first display element is visible through the window, when the desired tension is set.

In particular, the second display element, preferably formed as the window, in terms of the installation state of the drive unit, is located in front of the shaft and thus in front of the first display element. Thereby when mounting, the installation technician is able to view the display device from the front.

Preferably, the shaft axis of the shaft intersects the roller axis of the roller. Thereby, it is achieved that the force transmission between the tensioning unit and the roller is as direct as possible and has the least possible lever effect such that the linearly mobile carriage is prevented from canting.

Furthermore preferably, it is provided for the deflection roller to be limited by two opposing front faces. Said front faces are vertical to the roller axis. The drive belt runs between the two front faces. Preferably, the shaft axis runs between said two front faces, preferably centrally between said two front faces. This embodiment achieves as well the force transmission between the roller and the tensioning device being as direct as possible and having the least possible lever effect such that the carriage is prevented from canting during the linear mobility thereof.

Preferably, the drive unit comprises a carrier for stationarily mounting to the sub-structure. Preferably, the carriage is linearly mobile supported at the carrier. One of the two shaft receptions, preferably the first shaft reception with the female thread is disposed stationarily at the carrier.

Preferably, the carrier is formed as an integral component. For example, the carrier is a bent sheet-metal. Preferably, the carrier includes a carrier wall, which is connected to the sub-structure. Furthermore preferably, the carrier includes a carrier bottom, which in particular extends vertically to the carrier wall. Preferably, in the installed state of the drive unit, the carrier bottom extends vertically. Preferably, the carrier bottom carries the first shaft reception and the linearly mobile carriage.

Preferably, the first shaft reception is an area of the carrier bottom bent by 90°.

Preferably, the carrier comprises at least one slot. Preferably, the carriage comprises at least one sliding foot, which fits linearly mobile in the slot of the carrier.

Preferably, at least one affixing element, for example a screw, is provided in order to attach the carriage to the carrier. Preferably, said affixing element likewise extends through the at least one slot in the carrier. The affixing element makes it possible to block the linear mobility of the carriage with regard to the carrier, such that the carriage is stationarily attached to the carrier. Said affixing is in particular used, once the desired tensioning of the drive belt is set.

The carrier, in particular the carrier bottom, preferably includes a recess, through which the display device is visible. Thus, the installation technician is able to view both display elements of the display device via said recess. In particular, the two display elements are disposed to the recess in such a manner that the first display element moving towards the second display element is visible through the recess.

Furthermore, the disclosure comprises a sliding arrangement, in particular a sliding door. The sliding arrangement comprises the described drive unit, a sub-structure for attaching the carriage and the tensioning device, a counter-roller and the drive belt. In this case, the drive belt runs around the deflection roller of the drive unit and around the counter-roller.

Preferably, the shaft of the drive unit is disposed between the drive belt. At the deflection roller, the drive belt is deflected by 180° such that the drive belt has two parts running parallel and contradirectional to each other. Preferably, the shaft is located between said two contradirectional parts. In particular in this case, the shaft axis extends between the two front faces of the roller. Thereby, resulting in a very compact structure of the drive unit and of the entire sliding arrangement. Furthermore, force is transmitted as directly as possible between the roller and the tensioning device.

Preferably, at least one catch, which is formed for attaching to a leaf of the sliding arrangement, is disposed at the drive belt. Furthermore preferably, the sliding arrangement comprises at least one leaf, which is attached to the catch.

Preferably in the sliding arrangement, the shaft axis extends horizontally and/or parallel to the drive belt. Preferably, the roller axis extends vertically.

Preferably, it is provided for the sub-structure to have a back wall. Said back wall is formed for attaching to the carrying structure. As already described, said carrying structure is a wall, a door frame or another leaf, for example. Attaching the back wall of the sub-structure to the carrying structure makes the sub-structure stationary in relation to the carrying structure.

Preferably, the back wall comprises at least one attaching element, which is formed for attaching the sliding arrangement to the carrying structure. For example, said attaching element is a hole, through which a screw can be inserted, in particular.

Furthermore preferably, it is provided for the deflection roller to be disposed between the back wall and the carrier bottom. Particularly preferred, the roller axis is vertical to the back wall. In particular, in the installed state of the sliding arrangement, the roller axis is horizontally oriented. Correspondingly, the back wall extends in particular vertically in the installed condition of the sliding arrangement. The at least one attaching element, formed as a hole, preferably extends parallel to the roller axis such that a screw or another element is introducible into the hole parallel to the roller axis.

Furthermore preferably, it is provided for the shaft to be disposed between the back wall and the carrier bottom.

In addition to the compact structure of the sliding arrangement, in particular, disposing the deflection roller and/or the shaft between the back wall and the carrier bottom results as well in the installation technician having a good accessibility of the tensioning device.

Preferably in addition to the back wall, the sub-structure comprises a side wall as well. Preferably, back wall and side wall are vertical to each other. Preferably, the side wall is used for attaching the carrier, in particular the carrier wall. Particularly preferred, the carrier wall is screwed to the side wall of the sub-structure, wherein particularly preferred the herein used screw/s extend/s vertically to the roller axis and vertically to the shaft axis.

As already described, preferably, the second display element comprises a frame. Said frame essentially comprises at least one area. The one area is formed as an attachment section and serves for attaching the frame, for example to the carriage, in particular to the second shaft reception. The window is formed in the other area of the frame. Moreover, as already described, the carrier bottom can include a recess, through which the window and the first display element are visible.

Preferably in the installed state, the carrier bottom is visible from the front. Thus, the recess is visible from the front.

In a preferred embodiment, it is provided for the shaft to be disposed between the area of the frame with the window and the back wall. Thereby, the first display element, in particular in the arrangement thereof on the shaft, is visible through the window. The first display element can be visible from the front through the window and/or through the recess.

Moreover particularly preferred, it is provided for the shaft to be disposed in the area of the carrier bottom with the recess and the back wall. Thereby as well resulting in that the area of the frame with the window and thus as well the shaft with the first display element being very well visible through the recess.

Particularly preferred, it is provided for the area of the frame with the window and/or the area of the carrier bottom with the recess being formed parallel to the back wall. Preferably thus, in the installed state of the drive unit, respectively of the entire sliding arrangement, the area of the carrier bottom with the recess and the area of the frame with the window and the back wall are parallel to each other and in particular vertical.

Furthermore preferably, it is provided for the carrier bottom to comprise a first side and a second side opposite the first side. The first side is directed to the back wall, thus faces the back wall. In particular in the installed state, the first side is directed to the rear. The second side is facing away from the back wall. In particular in the installed state, the second side is directed to the front. In particular, both sides of the carrier bottom are parallel to each other and vertical to the roller axis.

At the at least one affixing element, which is used for the stationary attachment of the carriage with regard to the carrier, preferably an engagement is formed. Said engagement is formed for introducing torque into the affixing element or else for placing and/or loosening the affixing element; namely for actuating the affixing element. In particular, the engagement is a tool engagement. Particularly preferred, the engagement is formed as an external hexagon or hexagon socket.

Preferably, it is provided for the engagement of the at least one affixing element, in particular of all affixing elements, to be disposed at the second side of the carrier bottom and/or for the affixing element to be oriented vertically to the back wall. Thereby, ensuring an easily accessible affixing element. Thus, the installation technician has more ease for affixing the carriage in the tensioned position thereof, when tensioning the drive belt.

The shaft comprises a tool engagement, wherein the tool engagement corresponds to the engagement of the affixing element.

BRIEF DESCRIPTION OF THE DRAWINGS

Now, the disclosure is described in more detail based on an exemplary embodiment. In this case, it shows.

DETAILED DESCRIPTION OF THE DRAWINGS

Figure 1:
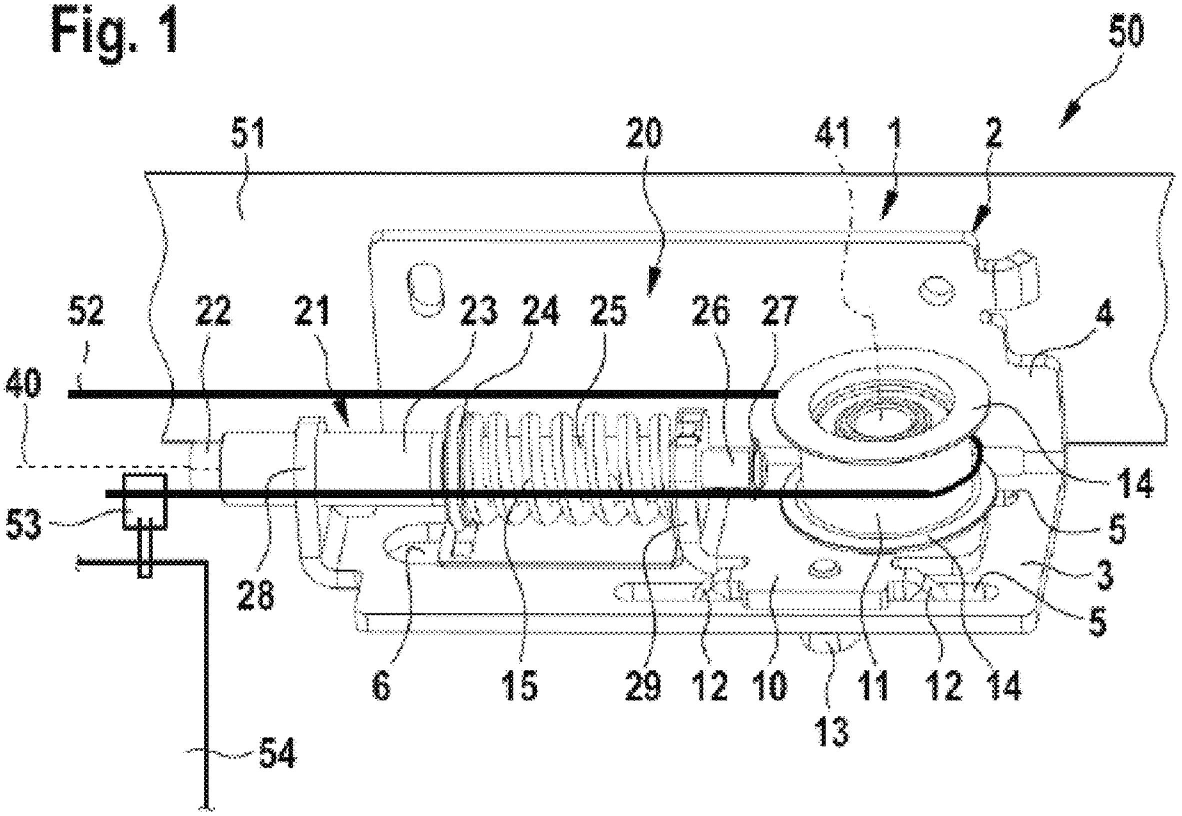
FIG. 1 an inventive sliding arrangement with inventive drive unit according to an exemplary embodiment, FIG. 2 a lateral view of the inventive drive unit according to the exemplary embodiment, FIG. 3 a bottom view of the inventive drive unit according to the exemplary embodiment, FIG. 4 individual components of the inventive drive unit according to the exemplary embodiment, FIG. 5 the inventive sliding arrangement with the inventive drive unit according to the exemplary embodiment in a perspective view, and FIG. 5*a* the inventive sliding arrangement with the inventive drive unit according to the exemplary embodiment in a perspective view, and FIG. 6 the inventive sliding arrangement with the inventive drive unit according to the exemplary embodiment in a further view.
Figure 2:
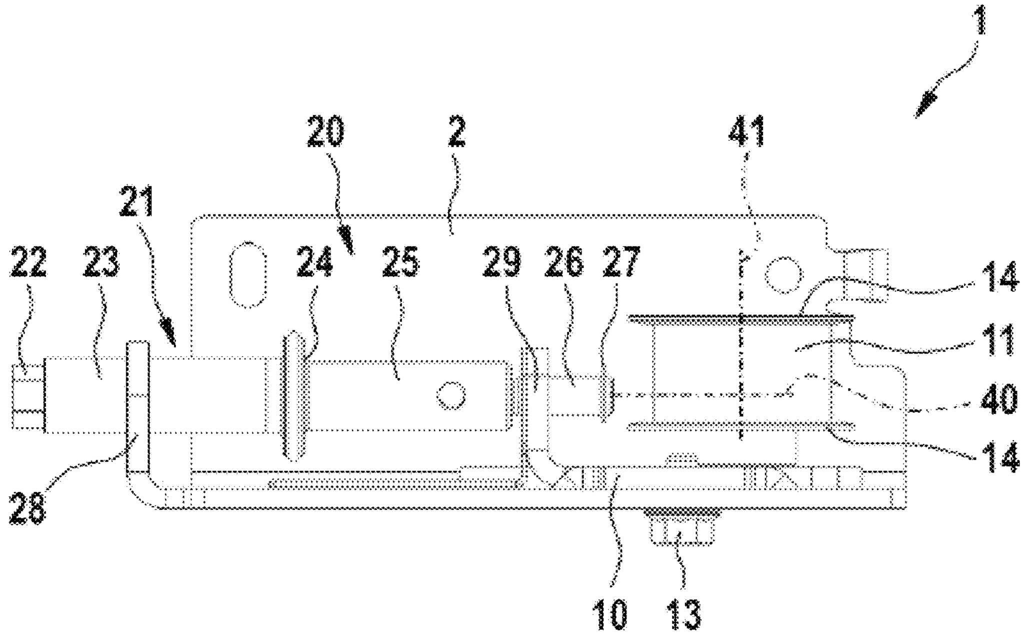
Figure 3:
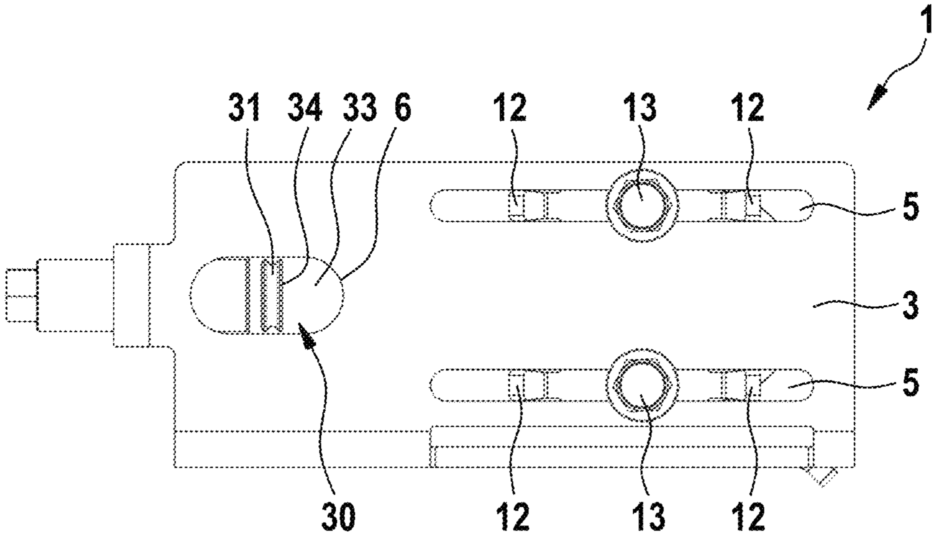
Figure 4:
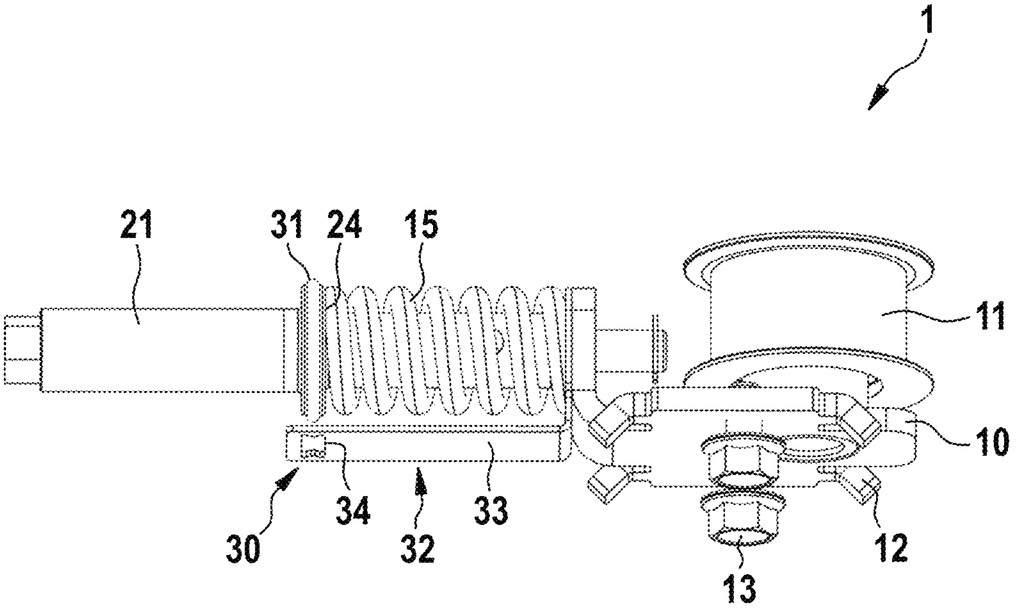
Figure 5:
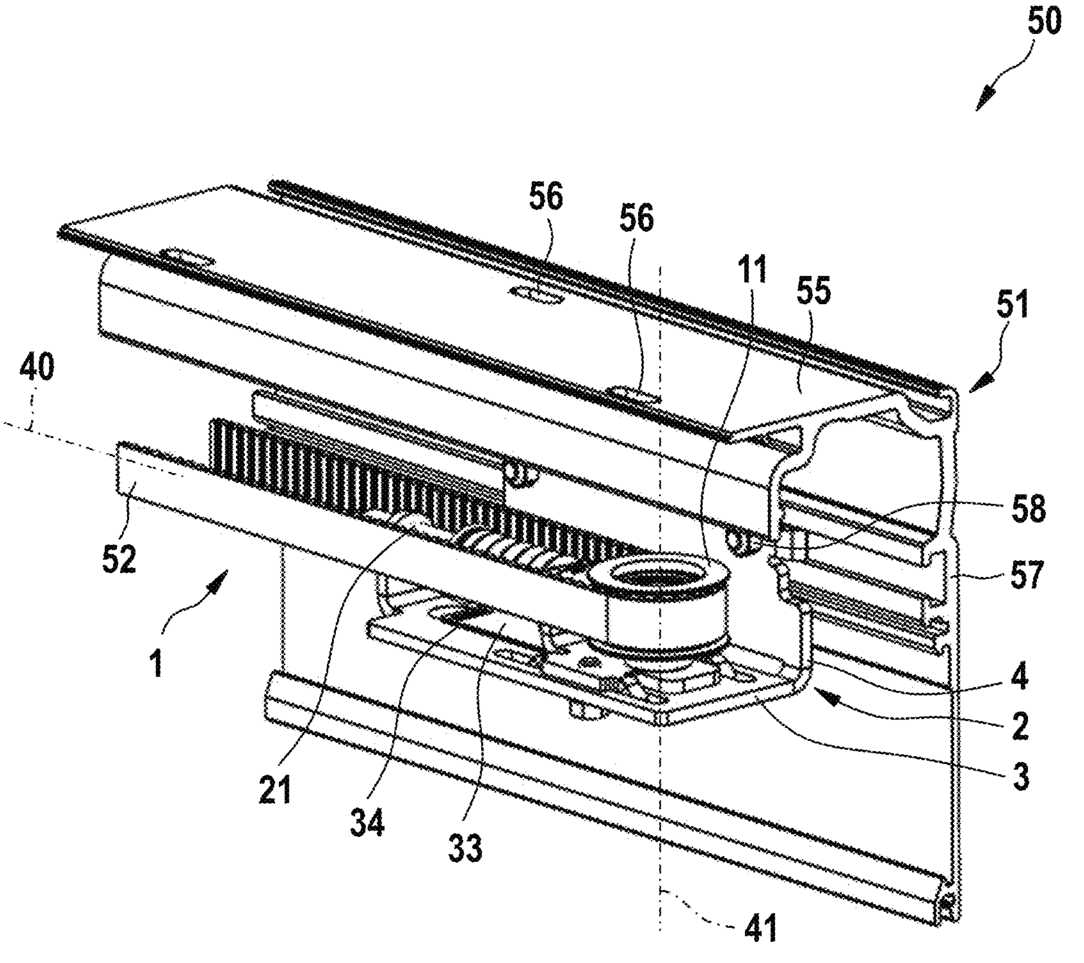
Figure 5A:
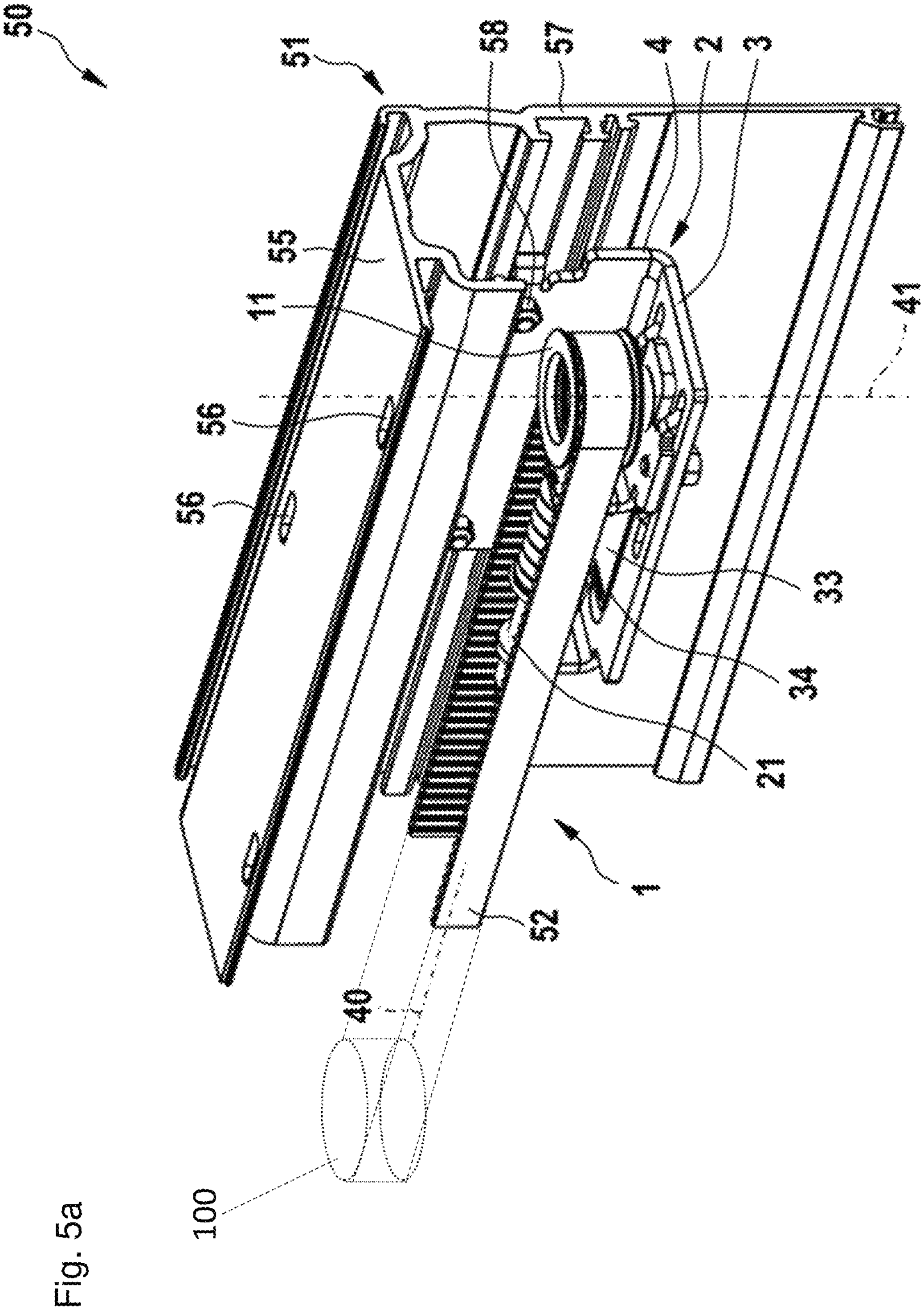
Figure 6:
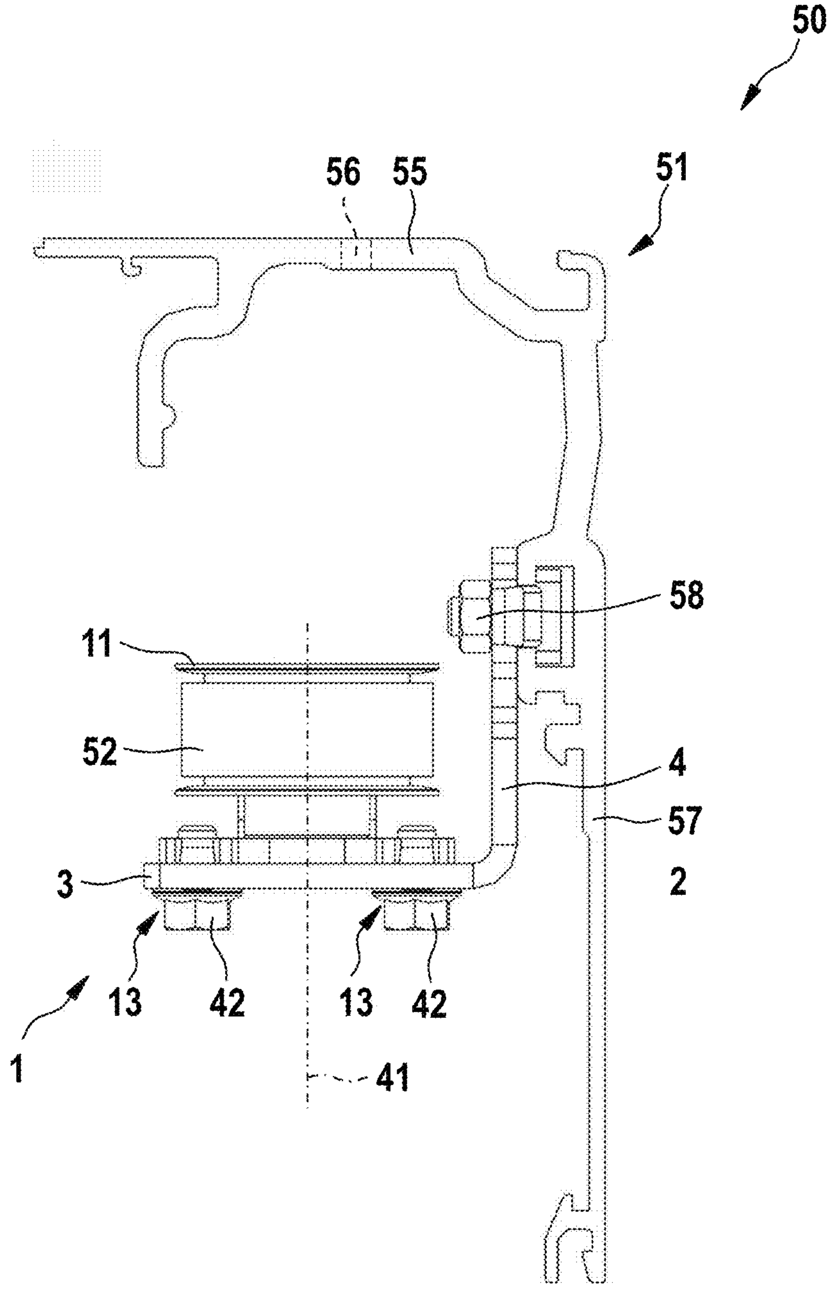

In the following is explained in more detail a sliding arrangement 50 with drive unit 1 based on FIGS. 1 to 6. FIG. 1 shows the drive unit 1 with purely diagrammatically illustrated components of the sliding arrangement 50. FIGS. 2 to 4 just show the drive unit 1. FIGS. 5 and 6 show the sliding arrangement 50 with drive unit 1 while considering several details of a sub-structure 51.

In addition to the drive unit 1, the sliding arrangement 50 comprises the sub-structure 51, to which the drive unit 1 is mounted. Furthermore, a drive belt 52 is provided, which extends around a deflection roller 11 of the drive unit 1 and a counter-roller 100.

Purely diagrammatically illustrated is a catch 53 disposed at the drive belt 52. A leaf 54, which is horizontally displaceable via the drive belt 52, is attachable or is attached to the catch 53. The sliding arrangement 50 can be formed as a moving unit for a sliding door, to which the leaf 54 is attachable. As an alternative, the sliding arrangement 50 can comprise the leaf 54 and can be formed as a sliding door. In FIG. 1, the illustration of the leaf 54 is purely diagrammatically seen, because preferably the leaf 54 is disposed vertically to the roller axis 41. Thus, unlike in the illustration of FIG. 1, the leaf 54 protrudes from the plane of the drawing.

The drive unit 1 according to FIGS. 1 to 4 comprises a carrier 2. The carrier 2 comprises a carrier bottom 3, which is connected to a carrier wall 4, in particular integrally manufactured. The carrier wall is attached in an immobile manner to the sub-structure 51.

There are slots 5 and a recess 6 in the carrier bottom 3.

Furthermore, the drive unit 1 comprises a carriage 10. The carriage 10 includes sliding feet 12. Respectively, one or more sliding feet 12 are linearly mobile guided in a slot 5. Furthermore, affixing elements 13 in the shape of screws are provided, which protrude through the slots 5 and function for affixing the carriage 10 with regard to the carrier 2.

A deflection roller 11, which guides the drive belt 52 between two opposing front faces 14, is located on the carriage 10. The deflection roller 11 is rotatable about a roller axis 41 with regard to the carriage 10. The carriage 10 is vertically mobile to the roller axis 41 and parallel linearly mobile to a shaft axis 40.

Furthermore, the drive unit 1 comprises a tensioning device 20. Said tensioning device 20 comprises a shaft 21, which is rotatable about the shaft axis 40. In a given order, the shaft 21 includes a tool engagement 22, an area with male thread 23, a spring abutment 24, a spring area 25, a sliding area 26 and a pull-out safety 27. For example, the tool engagement 22 is formed as a polygon such that a corresponding tool can rotate the shaft 21.

Furthermore, the tensioning device 20 includes a first shaft reception 28 with female thread. In the exemplary embodiment, the first shaft reception 28 is stationary in relation to the sub-structure 51. For this purpose, the first shaft reception 28 is an integral component of the carrier 2. The shaft 21 is fitted in the first shaft reception 28, wherein the male thread 23 of shaft 21 engages in the female thread of the first shaft reception 28.

Furthermore, the tensioning device 20 comprises a second shaft reception 29, which is linearly mobile in relation to the sub-structure 51. For this purpose, the second shaft reception 29 is formed as an integral component of the carriage 10. The shaft 21, with the sliding area 26 thereof, is fitted in the second shaft reception 29, such that the shaft 21 is linearly mobile in relation to the second shaft reception 29 parallel to the shaft axis 40. So that the shaft 21 does not slide out of the second shaft reception 29, a pull-out safety 27, in the shape of a securing ring, is provided at the end of the shaft 21.

Furthermore, the tensioning device 20 comprises a compression spring 15. The compression spring 15 is fitted on the spring area 25. One end of the compression spring 15 props up at the second shaft reception 29 and thus at the carriage 10. The other end of the compression spring 15 props up against the spring abutment 24 on the shaft 21.

The compression spring 15 is masked in FIG. 2. It can be very well seen in this illustration that the shaft 21 does not abut at the second shaft reception 29, but the carriage 10 is linearly mobile with regard to the shaft 21. Just the compression spring 15 transmits the force from the shaft 21, respectively the spring abutment 24, to the carriage 10, when tensioning the drive belt 52.

As in particular FIGS. 3 and 4 reveal, the drive unit 1 includes a display device 30. Said display device 30 comprises a first display element 31 and a second display element 32. The first display element 31 is formed on the shaft 21. In the exemplary embodiment shown, the shaft 21 has a groove at the spring abutment 24, in which a coloured rubber ring is seated.

The second display element 32 comprises a window 34, through which the first display element 31 is visible, when tension is correctly set. The window 34 is slot-shaped.

In particular for this purpose, the recess 6 is provided in the carrier bottom 3, such that from the front the installation technician sees both the window 34 and the first display element 31.

In the exemplary embodiment shown, the second display element 32 comprises a frame 33, in which the window 34 is hollowed out.

The frame 33 is clipsed to the second shaft reception 29 and thereby stationary in relation to the carriage 10.

In the following based on FIGS. 5 and 6, the sliding arrangement 50 with the drive unit 1 is described in more detail while considering details of the sub-structure 51. The two Figures show that the sub-structure 51 comprises a back wall 55 and a side wall 57. Essentially, the back wall 55 is vertical to the roller axis 41. Essentially, the side wall 57 is parallel to the roller axis 41 and parallel to the shaft axis 40. In the installed state, the back wall 55 is vertically oriented and is located at a carrying structure.

Preferably, in the installed state, the side wall 57 is horizontally oriented. The side wall 57 can face the ceiling of a room. The not-illustrated leaf 54 adjoins in FIG. 6 on the left hand side. For a sliding arrangement of the leaf 54, a rail projects from the back wall 55. The rail is oriented parallel to the side wall 57. The rail can accommodate a roller carriage as the catch 52, to which the leaf 54 is attachable.

The back wall 55 is used for attaching the sub-structure 51 to a carrying structure. For this purpose, the back wall 55 includes several attaching elements 56, herein formed a through holes. Said through holes extend parallel to the roller axis 41, so that parallel to the roller axis 41, screws can be inserted into the attaching elements 56 for screwing the back wall 55 to the carrying structure.

The side wall 57 is used for attaching the carrier 2, herein the carrier wall 4. The carrier 2, in particular the carrier wall 4, is attached with carrier attaching elements 58, in particular in the shape of screws, to the side wall 57 of the sub-structure 51. Preferably, said carrier attaching elements 58 in the shape of screws extend vertically to the side wall 57 and/or vertically to the roller axis 41.

FIGS. 5 and 6 show that the deflection roller 11 and the shaft 21 are located between the carrier bottom 3 and the back wall 55 of the sub-structure 51. Correspondingly, the drive belt 52 extends between carrier bottom 3 and back wall 55.

Said arrangement makes the tool engagement 22 at the shaft 21 easily accessible from the front for the installation technician.

Moreover, the recess 6 in the carrier bottom 3 points to the front, such that the area of the frame 33 with the window 34 is very well visible from the front through the recess 6.

Again, the first display element 31 on the shaft 21 is visible through said window 34.

FIG. 6 makes clear that the affixing elements 13 have respectively one engagement 42, herein formed as an external hexagon. Said engagement 42 is located on the under side (second side) of the carrier bottom 3. Thereby, the engagements 42 of the affixing elements 13 are easily accessible from the front for the installation technician. The shaft 21 comprises a tool engagement 22, wherein the tool engagement 22 corresponds to the engagement 42 of the affixing element 13. Hereby, the installation technician is able to use the same tool for rotating the shaft 21 and thus for tensioning the drive belt 52 as for rotating the affixing element and thus for attaching the carriage 10 to the carrier 2.

When mounting, initially the installation technician can attach the pre-mounted drive unit 1 to the sub-structure 51. For this purpose, the carrier 2 is attached to the sub-structure by means of carrier attaching elements 58. Hereby, the carrier 2 is attached in such a manner to the sub-structure 51 that the drive belt 52 is pre-tensioned. In this case, the carrier 2 can be disposed at different locations of a groove of the side wall 57.

Thereby, without changing his/her position, the installation technician can engage with a tool at the tool engagement 22 of the shaft 21 and rotate the shaft 21 for so long until the first display element 31 appears in the window 34. Hereby, the correct tension is set. In this case, without changing his/her position, while rotating the shaft 21, the installation technician is able to see the window 34 through the recess 6. Hereby, the installation technician can see through the recess 6, as the first display element 31 moves towards the window 34.

Now, without changing his/her position, the installation technician is able to engage the same tool at the engagement 42. Now, the affixing screw 13 allows for fixing the carriage 10 at the set position with regard to the carrier 2. Hereby, keeping the drive belt 52 tensioned at the correct force.

The invention claimed is:

1. A drive unit for a sliding door comprising:

a carriage, which is formed for linearly mounting in relation to a sub-structure of the sliding door, a deflection roller rotatable around a roller axis, at the carriage for deflecting a drive belt of the sliding door, and a tensioning device, comprising:

a shaft with male thread rotatable around a shaft axis, a first shaft reception with female thread for receiving the male thread of the shaft, a second shaft reception for linearly receiving the shaft, the shaft extending through the second shaft reception wherein the second shaft reception is configured to hold the shaft, and a compression spring between the second shaft reception and a spring abutment at the shaft, wherein the shaft is disposed for tensioning the drive belt by increasing the distance between the first shaft reception and the second shaft reception, further comprising a carrier for stationarily mounting to the sub-structure, wherein the carriage is linearly supported at the carrier, and wherein one of the two shaft receptions is stationarily disposed at the carrier, comprising at least one affixing element for immobile affixing the carriage to the carrier, wherein the first shaft reception is fixed to a carrier bottom and the second shaft reception is fixed to the carriage; and a display device for displaying the tension of the drive belt with a first display element on the shaft and a second display element, which is disposed stationarily with regard to the second shaft reception, wherein the second display element comprises a frame with a window, through which the first display element is capable of being seen through the window.

2. The drive unit according to claim 1, wherein one of the two shaft receptions is formed for stationary mounting in relation to the sub-structure, and wherein the other one of the two shaft receptions is disposed at the carriage.

3. The drive unit according to claim 1, wherein the compression spring is formed as a spiral spring, on which the shaft is fitted.

4. The drive unit according to claim 1, wherein the shaft axis intersects the roller axis.

5. The drive unit according to claim 1, wherein the deflection roller is delimited by two opposing front faces and the shaft axis extends between the two front faces.

6. The drive unit according to claim 1, wherein the carrier includes a recess, through which the display device is visible.

7. A sliding arrangement comprising the drive unit according to claim 1, the sub-structure, a counter-roller and the drive belt, wherein the drive belt extends circulating around the deflection roller and the counter-roller.

8. The sliding arrangement according to claim 7, wherein the shaft is disposed between the drive belt.

9. The sliding arrangement according to claim 7, wherein the sub-structure includes a back wall with at least one attaching element for attaching the sliding arrangement to a carrying structure, wherein the deflection roller is disposed between the back wall and the carrier bottom, and wherein the roller axis is aligned perpendicular to the back wall.

10. The sliding arrangement according to claim 9, wherein the shaft is disposed between an area of the frame with the window and the back wall, and/or wherein the shaft is disposed between an area of the carrier bottom with a recess and the back wall; wherein the area of the frame with the window and/or the area of the carrier bottom with the recess is/are formed parallel to the back wall.

11. The sliding arrangement according to claim 9, wherein the carrier bottom comprises a first side and a second side opposite the first side, wherein the first side is facing the back wall and the second side is facing away from the back wall, wherein an engagement for actuating the affixing element is disposed at the second side and/or the affixing element is oriented to the back wall.

12. A drive unit for a sliding door comprising:

a carriage, which is formed for linearly mounting in relation to a sub-structure of the sliding door, a deflection roller rotatable around a roller axis, at the carriage for deflecting a drive belt of the sliding door, and a tensioning device, comprising:

a shaft with male thread rotatable around a shaft axis, first shaft reception with female thread for receiving the male thread of the shaft, second shaft reception for linearly receiving the shaft, the shaft extending through the second shaft reception wherein the second shaft reception is configured to hold the shaft, and a compression spring between the second shaft reception and a spring abutment at the shaft, wherein the shaft is disposed for tensioning the drive belt by increasing the distance between the first shaft reception and the second shaft reception, and further comprising a carrier for stationarily mounting to the sub-structure, wherein the carriage is linearly supported at the carrier, and wherein one of the two shaft receptions is stationarily disposed at the carrier, comprising at least one affixing element for immobile affixing the carriage to the carrier, and further comprising a display device for displaying the tension of the drive belt with a first display element on the shaft and a second display element, which is disposed stationarily with regard to the second shaft reception, wherein the second display element comprises a frame with a window, through which the first display element is visible at a certain setting of the tension.

* * * * *